(12) United States Patent
Yoshida et al.

(10) Patent No.: US 9,121,732 B2
(45) Date of Patent: Sep. 1, 2015

(54) ENCODER, SERVOMOTOR, AND MOTOR UNIT

(71) Applicant: KABUSHIKI KAISHA YASKAWA DENKI, Kitakyushu-shi (JP)

(72) Inventors: Yasushi Yoshida, Kitakyushu (JP); Koji Suzuki, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 235 days.

(21) Appl. No.: 13/778,120

(22) Filed: Feb. 27, 2013

(65) Prior Publication Data

US 2013/0169209 A1 Jul. 4, 2013

Related U.S. Application Data

(63) Continuation of application No. PCT/JP2011/069949, filed on Sep. 1, 2011.

(30) Foreign Application Priority Data

Sep. 2, 2010 (JP) ................................ 2010-197010

(51) Int. Cl.
*G05B 1/06* (2006.01)
*G01D 5/26* (2006.01)
(Continued)

(52) U.S. Cl.
CPC .............. *G01D 5/266* (2013.01); *G01D 5/3473* (2013.01); *G01D 5/38* (2013.01); *G05B 1/08* (2013.01); *H02K 11/0026* (2013.01)

(58) Field of Classification Search
USPC ............ 318/460, 638, 640; 310/10, 40 R, 66, 310/68 R, 68 B; 356/450, 456, 498, 499
See application file for complete search history.

(56) References Cited

U.S. PATENT DOCUMENTS 4,253,021 A 2/1981 Ernst
4,772,835 A * 9/1988 Weaver et al. ................ 318/640
(Continued)

FOREIGN PATENT DOCUMENTS

CN 1171560 1/1998
DE 3807011 C1 4/1989
(Continued)

OTHER PUBLICATIONS

Japanese Office Action for corresponding JP Application No. 2012-531968, Jan. 7, 2014.
(Continued)

*Primary Examiner* — Kawing Chan
(74) *Attorney, Agent, or Firm* — Mori & Ward, LLP

(57) ABSTRACT

This disclosure discloses an encoder. The encoder includes a disk including a first and a second track. A first and a second rotating grating are formed in the first and second tracks, respectively. A first and a second detector are disposed so as to face the first and second tracks, and have a first fixed grating constructing a first diffraction interference optical system together with the first rotating grating and a second fixed grating constructing a second diffraction interference optical system together with the second rotating grating, respectively, and configured to detect a first and a second detection signal, respectively, from the first and second diffraction interference optical systems. At least one of the first and second rotating gratings is formed by a plurality of curved slits in a curved shape.

15 Claims, 10 Drawing Sheets

(51) Int. Cl.
*G01D 5/347* (2006.01)
*G01D 5/38* (2006.01)
*G05B 1/08* (2006.01)
*H02K 11/00* (2006.01)

(56) References Cited

U.S. PATENT DOCUMENTS

| | | | |
|---|---|---|---|
| 5,017,776 A * | 5/1991 | Loewen | 250/231.14 |
| 5,537,210 A | 7/1996 | Kaneda et al. | |
| 5,559,600 A | 9/1996 | Mitchell | |
| 5,663,794 A * | 9/1997 | Ishizuka | 356/499 |
| 5,981,941 A | 11/1999 | Takata et al. | |
| 7,595,480 B2 | 9/2009 | Kress | |
| 7,714,273 B2 * | 5/2010 | Saendig | 250/231.13 |
| 8,218,134 B2 * | 7/2012 | Al-Rawi | 356/139 |
| 2007/0180714 A1 | 8/2007 | Siraky | |
| 2008/0087805 A1 | 4/2008 | Kress | |
| 2010/0051792 A1 | 3/2010 | Sheu et al. | |
| 2011/0298411 A1 * | 12/2011 | Yoshida et al. | 318/640 |
| 2013/0076289 A1 * | 3/2013 | Yamaguchi et al. | 318/640 |

FOREIGN PATENT DOCUMENTS

| | | |
|---|---|---|
| DE | 10 2006 021 484 | 11/2007 |
| EP | 0770850 | 5/1997 |
| EP | 1457762 | 9/2004 |
| EP | 2219012 | 8/2010 |
| GB | 2247313 | 2/1992 |
| JP | 06-347293 | 12/1994 |
| JP | 08-304113 | 11/1996 |
| JP | 3509830 B2 | 5/1997 |

OTHER PUBLICATIONS

International Search Report for corresponding International Application No. PCT/JP2011/069949, Dec. 6, 2011.
Chinese Office Action for corresponding CN Application No. 201180042366.X, Sep. 24, 2014.
Extended European Search Report for corresponding EP Application No. 11821942.7-1558, Sep. 9, 2014.
Chinese Office Action for corresponding CN Application No. 201180042366.X, Jun. 5, 2015.

* cited by examiner

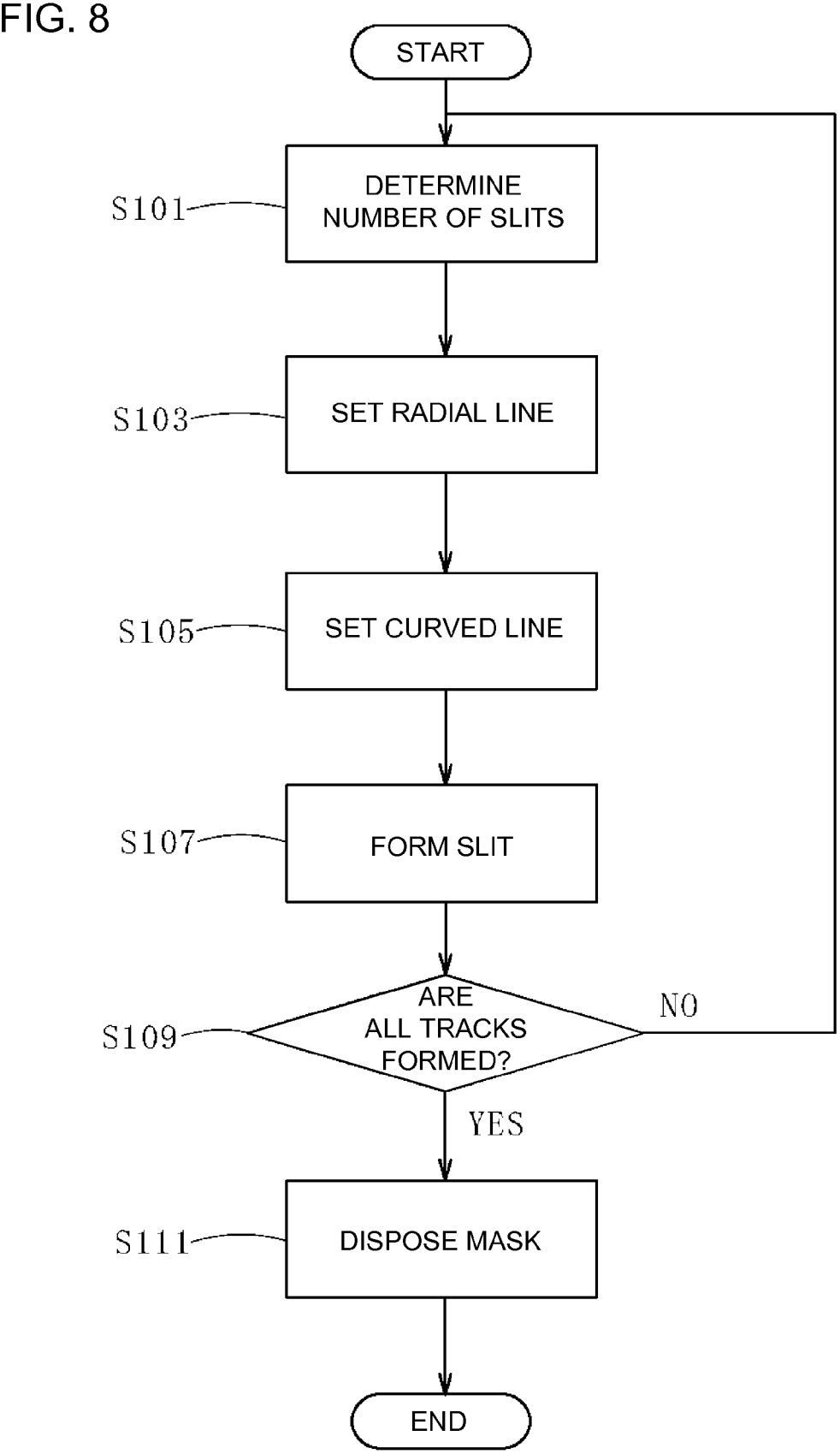

ENCODER, SERVOMOTOR, AND MOTOR UNIT

CROSS-REFERENCE TO RELATED APPLICATION

This is a continuation application PCT/JP2011/069949, filed Sep. 1, 2011, which was not published under PCT article 21(2) in English.

FIELD OF THE INVENTION

The present disclosure relates to an encoder, a servomotor, and a motor unit.

DESCRIPTION OF THE RELATED ART

U.S. Pat. No. 5,559,600 A discloses an optical encoder that utilizes diffraction of light by a diffraction grating.

JP, B, 3509830 discloses an optical encoder that has improved an S/N ratio (Signal to Noise Ratio) using three slits.

JP, A, 06-347293 discloses an optical encoder that prevents an error from occurring resulting from pitch fluctuations with a simple configuration. The encoder has a spiral grating unit, a light-emitting element, and a light-receiving element configured to detect light flux emitted from the light-emitting element and having passed through the grating unit. The encoder detects relative rotation between the grating unit and the light-receiving element based on detection of the light-receiving element.

SUMMARY OF THE INVENTION

According to one aspect of the disclosure, there is provided an encoder, including a disk disposed rotatably about a rotating axis and including a first track and a second track in which a first optical rotating grating and a second optical rotating grating are formed, respectively, and a first detector and a second detector disposed so as to face the first track and the second track, including a first fixed grating constructing a first diffraction interference optical system together with the first rotating grating and a second fixed grating constructing a second diffraction interference optical system together with the second rotating grating, respectively, and configured to detect a first detection signal and a second detection signal from the first diffraction interference optical system and the second diffraction interference optical system, respectively. At least one of the first rotating grating and the second rotating grating includes a plurality of curved slits in a curved shape, and an absolute value of the disk is obtained based on a difference in the number of slits between the first rotating grating and the second rotating grating.

According to one another aspect of the disclosure, there is provided a servomotor, including a motor configured to rotate a rotary shaft, and an encoder configured to measure an absolute position of the rotary shaft. The encoder comprises a disk disposed rotatably about a rotating axis of the rotary shaft and including a first track and a second track in which a first optical rotating grating and a second optical rotating grating are formed, respectively, and a first detector and a second detector disposed so as to face the first track and the second track, including a first fixed grating constructing a first diffraction interference optical system together with the first rotating grating and a second fixed grating constructing a second diffraction interference optical system together with the second rotating grating, respectively, and configured to detect a first detection signal and a second detection signal from the first diffraction interference optical system and the second diffraction interference optical system, respectively. At least one of the first rotating grating and the second rotating grating includes a plurality of curved slits in a curved shape, and an absolute value of the disk is obtained based on a difference in the number of slits between the first rotating grating and the second rotating grating.

According to one another aspect of the disclosure, there is provided a motor unit, including a motor configured to rotate a rotary shaft, an encoder configured to measure a position of the rotary shaft, and a controller configured to control rotation of the motor based on the position detected by the encoder. The encoder has a disk disposed rotatably about a rotating axis of the rotary shaft and including a first track and a second track in which a first optical rotating grating and a second optical rotating grating are formed, respectively, and a first detector and a second detector disposed so as to face the first track and the second track, including a first fixed grating constructing a first diffraction interference optical system together with the first rotating grating and a second fixed grating constructing a second diffraction interference optical system together with the second rotating grating, respectively, and configured to detect a first detection signal and a second detection signal from the first diffraction interference optical system and the second diffraction interference optical system, respectively. At least one of the first rotating grating and the second rotating grating includes a plurality of curved slits in a curved shape, and an absolute value of the disk is obtained based on a difference in the number of slits between the first rotating grating and the second rotating grating.

BRIEF DESCRIPTION OF THE DRAWINGS

FIG. 8 is a flowchart for explaining a method for manufacturing the encoder.

DESCRIPTION OF THE EMBODIMENTS

Subsequently, embodiments embodying the present disclosure are explained with reference to the accompanied drawings for understanding of the present disclosure. Note that, in the present specification and the drawings, components having substantially the same functions are represented by the same symbols in principle and duplicated explanation of the components is omitted appropriately.

In each embodiment of the present disclosure to be explained below, explanation is given using a motor unit having a rotary, optical absolute-value encoder as an example. That is, the encoder according to each embodiment is applied to a rotary motor and detects a rotation angle θ of the motor as an absolute position x. The encoder according to each embodiment to be explained here can be applied to a variety of rotating bodies, which rotate about a fixed rotating axis, such as, for example, a motor and steering.

Note that, each embodiment of the present disclosure is explained in the following order.

<1. First embodiment>
  (1-1. Motor unit according to first embodiment)
  (1-2. Encoder according to first embodiment)
    (1-2-1. Disk 110)
      (Tracks TA-TC)
      (Shapes of slits SLA-SLC)
    (1-2-2. Detectors 130A-130C)
      (Optical detection mechanism)
    (1-2-3. Configuration of curved slit)
      (Curved slit in one track T)
      (Positional relationship between curved slit and slit on fixed grating side)
      (Curved slits in relationship among a plurality of tracks)
    (1-2-4. Position data generating portion)
  (1-3. Operation of motor unit according to first embodiment)
  (1-4. Method for manufacturing encoder according to first embodiment)
  (1-5. Example of effect by encoder according to first embodiment)
<2. Second embodiment>

1. First Embodiment

1-1. Motor Unit According to First Embodiment

First, a configuration of a motor unit 1 according to a first embodiment of the present disclosure is explained.

Figure 1:
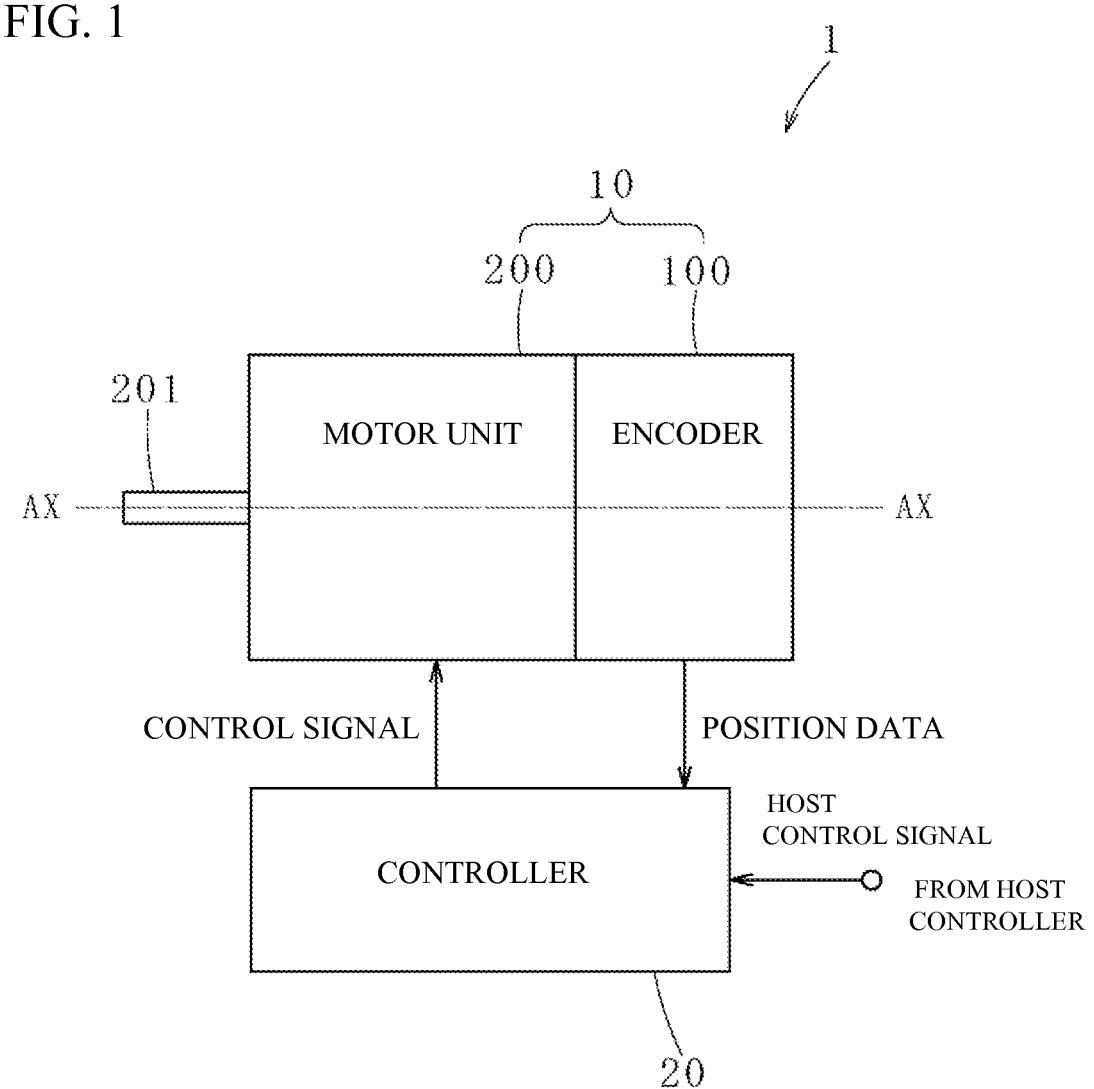
FIG. 1 is an explanatory diagram showing a configuration of a motor unit having an encoder according to a first embodiment of the present disclosure.

As shown in FIG. 1, the motor unit 1 according to the present embodiment has a servomotor 10 and a controller 20. The servomotor 10 has an absolute-value encoder (hereinafter, called simply as an "encoder" sometimes) 100 and a motor 200.

The motor 200 is an example of a power generation source. The motor 200 has a rotary shaft 201 at least on one side. The motor 200 generates rotational force by rotating the rotary shaft 201 about a rotating axis AX.

Note that, the motor 200 is not limited to an electric motor using electricity as a power source. The motor 200 may be a motor using another power source, such as a hydraulic motor, an air motor, a steam motor, and the like. However, for convenience of explanation, the case where the motor 200 is an electric motor is explained below.

The encoder 100 is disposed at the end part on the opposite side of the rotary shaft 201 of the motor 200 and is coupled to a rotary shaft 202 (see FIG. 2) that rotates in correspondence with the rotary shaft 201. Note that, there is also a case where the rotary shaft 202 is integrated with the rotary shaft 201 into one unit. The encoder 100 detects the absolute position x of the rotary shaft 201 (also called the rotation absolute angle θ, the absolute position x of the motor 200, or the like) by detecting the position of the rotary shaft 202 and outputs position data representing the absolute position x.

It should be noted that the disposition position of the encoder 100 is not limited in particular. For example, the encoder 100 may be disposed so as to be directly coupled to the rotary shaft 201. Alternatively, the encoder 100 may be coupled to a rotating body, such as the rotary shaft 201, via another mechanism, such as a reduction device and a rotation direction converter.

The controller 20 acquires position data output from the encoder 100. The controller 20 controls rotation of the motor 200 by controlling current, voltage, or the like, to be applied to the motor 200 based on the acquired position data. The controller 20 is, for example, a servo amplifier. Further, it is also possible for the controller 20 to control rotation of the motor 200 so as to obey a position command, a speed command, or the like, included in a higher-order control signal, which is acquired from a higher-order controller (not shown schematically), such as, for example, a programmable logic controller. Note that, in the case where the motor 200 uses another power source, such as a hydraulic power source, an air power source, and a steam power source, it is possible for the controller 20 to control rotation of the motor 200 by controlling supply of such a power source.

1-2. Encoder According to First Embodiment

Subsequently, the configuration of the encoder 100 according to the present embodiment is explained with reference to FIG. 2 and FIG. 3.

Figure 2:
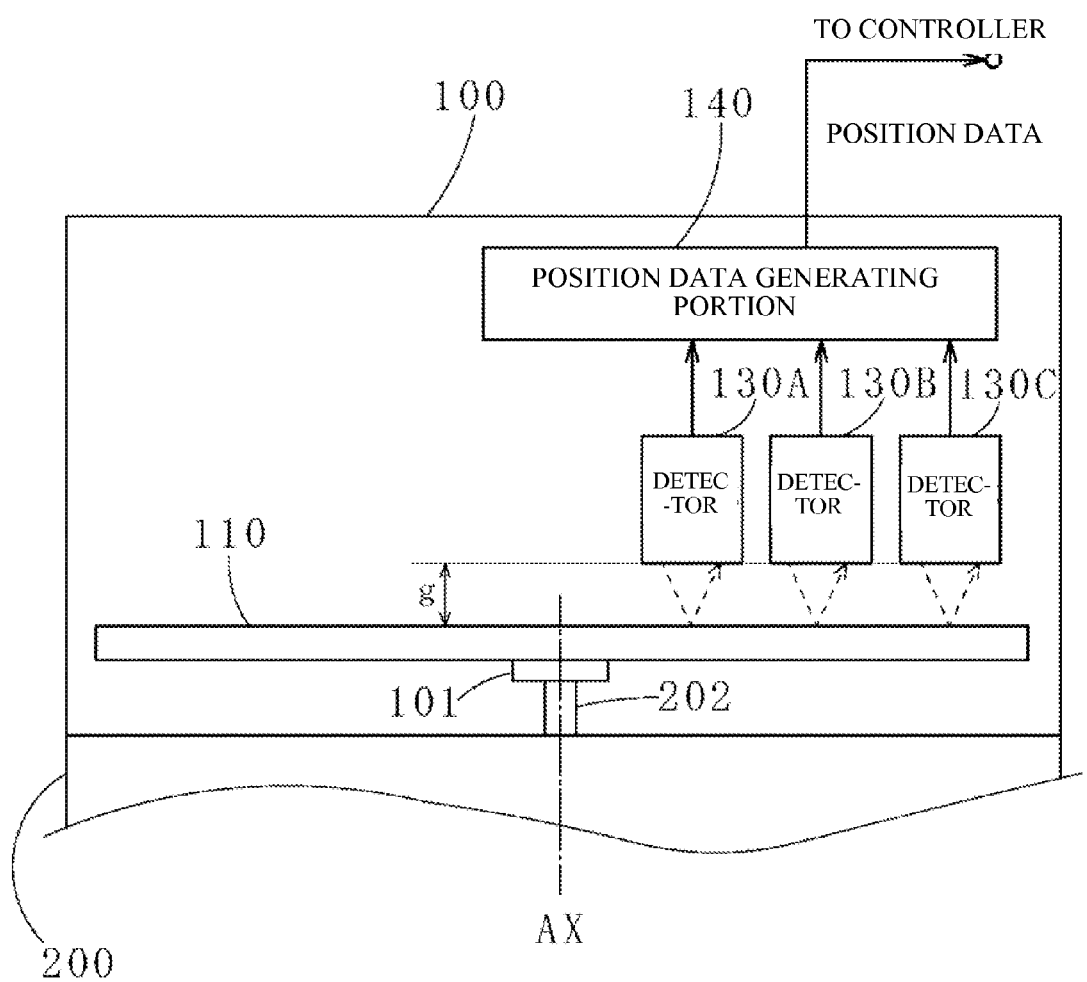
FIG. 2 is an explanatory diagram showing a configuration of the encoder.

As shown in FIG. 2, the encoder 100 according to the present embodiment has a rotary shaft 101, a disk 110, detectors 130A-130C (examples of the first to third detectors, respectively), and a position data generating portion 140.

(1-2-1. Disk 110)

Figure 3:
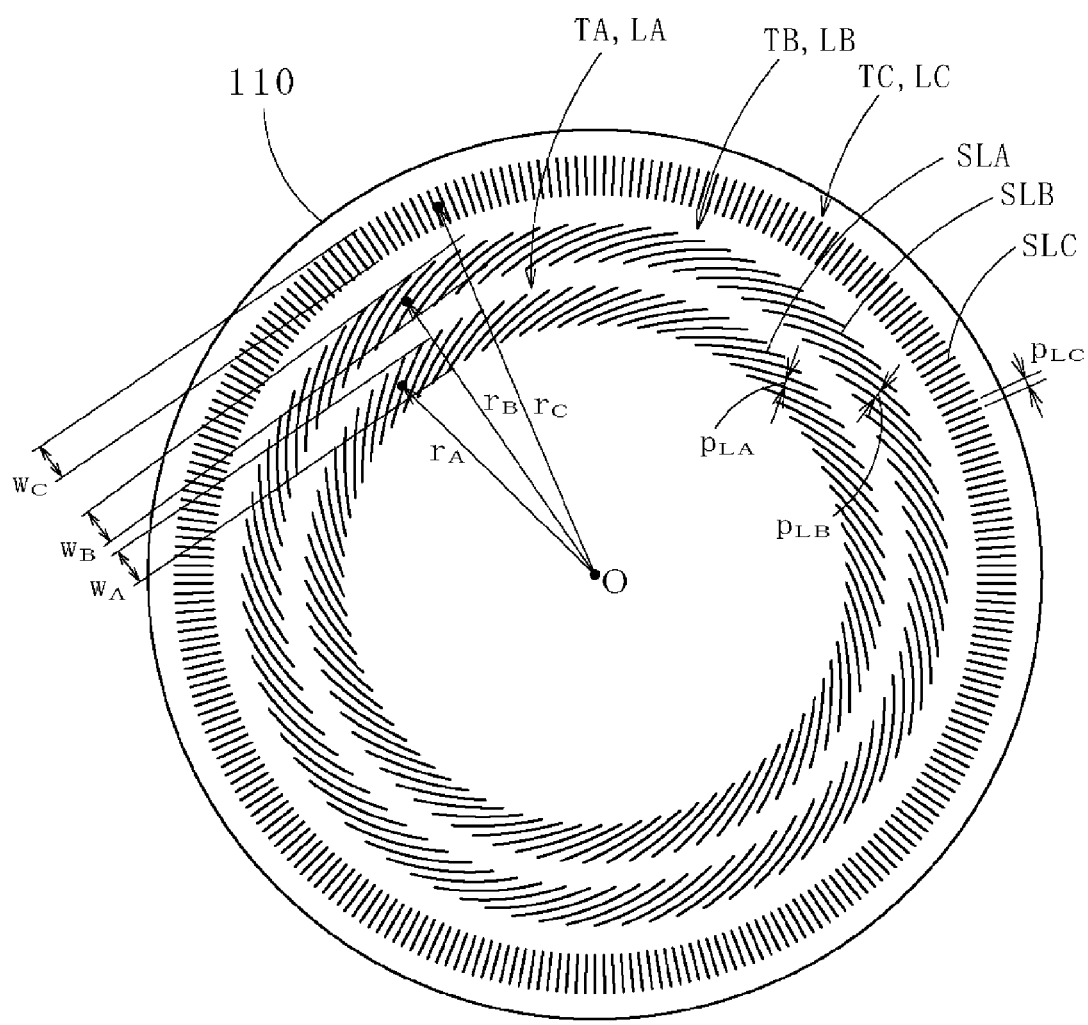
FIG. 3 is an explanatory diagram showing a disk of the encoder.

The disk 110 is formed into a disc shape as shown in FIG. 3. The disk 110 is disposed in the manner that a disk center O substantially agrees with the rotating axis AX. The disk 110 is coupled to one end of the rotary shaft 202 of the motor 200 via the rotary shaft 101 rotatable about the rotating axis AX. Consequently, the disk 110 rotates about the rotating axis AX in accordance with rotation of the motor 200.

As shown in FIG. 3, the disk 110 has three tracks TA-TC (examples of the first to third tracks, respectively). Note that, the number of tracks is not limited to three but is appropriately set to a plural number in accordance with detection precision and signal processing required for the encoder 100.

(Tracks TA-TC)

The tracks TA-TC are each in the shape of a ring with the disk center O of the disk 110 as a center. The widths of the tracks TA-TC are set to widths $w_A$-$w_C$ determined in advance, respectively. In the present embodiment, the widths $w_A$-$w_C$ of the respective tracks TA-TC are set to the same width w ($w=w_A=w_B=w_C$). However, the track widths $w_A$-$w_C$ may be different.

Then, the respective tracks TA-TC are disposed in the manner that the positions in the radial direction (track radii $r_A$-$r_C$) in the center of the width w are different from each other. That is, the tracks TA-TC are formed into a concentric circular shape with the disk center O as a center and disposed in order of the tracks TA, TB, and TC from the disk center toward the outer periphery ($r_A<r_B<r_C$).

As shown in FIG. 3, rotating gratings LA-LC (examples of the first to third rotating gratings, respectively), which are optical diffraction gratings that rotate, are formed in the respective tracks TA-TC, respectively.

A plurality of optical slits SLA-SLC is formed in the rotating gratings LA-LC, respectively. The rotating gratings LA-LC each construct an individual part of first to third diffraction interference optical systems independent of one another.

Each of the slits SLA-SLC is a reflection slit configured to reflect light. Portions other than the slits SLA-SLC do not reflect light.

In the case where the reflection slit is used in the disk 110 as in the present embodiment, a reflection-type diffraction interference optical system is formed. Consequently, compared to the case where a transmission slit is used in the disk 110, noise and the influence on detection precision due to fluctuations of a gap g between the disk 110 and a mask 120, to be described later, are reduced. However, it is possible to construct a diffraction interference optical system using a transmission slit.

It is desirable for the respective tracks TA-TC to be formed in the manner that the larger the track radii $r_A$-$r_C$, the larger numbers $n_A$-$n_C$ of slits SLA-SLC are. That is, since the track radii are in a relationship of "$r_A < r_B < r_C$", the numbers of slits of the respective tracks TA-TC are set so as to satisfy a relationship of "$n_A < n_B < n_C$". From the respective tracks TA-TC, period signals in the number of repetitions in accordance with the numbers $n_A$-$n_C$ of slits are obtained, respectively. The numbers of repetitions per rotation (360°) of the disk 110 in the period signals are also called numbers $m_A$-$m_C$ of cycles, respectively. That is, the numbers $m_A$-$m_C$ of cycles are numbers in accordance with the numbers $n_A$-$n_C$ of slits, respectively. Consequently, the numbers $n_A$-$n_C$ of slits of the respective tracks TA-TC are set to numbers in accordance with required resolutions in the manner that the absolute position x can be detected with required precision. However, the number $n_A$ of slits is smaller than the number of $n_B$ of slits by one.

Each of pitches $p_{LA}$-$p_{LC}$ of the slits SLA-SLC is set to substantially the same pitch p ($p = p_{LA} = p_{LB} = p_{LC}$). Here, the pitches $p_{LA}$-$p_{LC}$ of slits are intervals (pitches) of slits in the center part of the widths $w_A$-$w_C$ of tracks. By setting the respective pitches $p_{LA}$-$p_{LC}$ of the plurality of tracks TA-TC to substantially the same pitch, the diffraction interference optical systems of the plurality of the tracks TA-TC are made common. Consequently, it is possible to facilitate manufacture (including the process of designing or development).

(Shapes of Slits SLA-SLC)

Here, the shapes of the slits SLA-SLC are explained.

The slit SLA (an example of the first curved slit) and the slit SLB (an example of the second curved slit) are formed as "curved slits" curved at a curve degree determined in advance. The curved slit will be described later in detail.

The slits SLC are formed along a plurality of radial lines (radial line LINE1 in FIG. 6) set at angular intervals determined in advance with the disk center O (rotating axis AX) as a center so as to extend in the radial direction. The slits in such a shape are also called "radial slits". In the present embodiment, the number $n_C$ of slits SLC is the largest and the maximum resolution of the encoder 100 is determined by the track TC.

Here, in the case where the same number of slits are formed at the same pitch (the same resolution), if the radial slits are used, the track radius can be suppressed to a small one. Consequently, by forming the slits SLC using the radial slits, it is possible to suppress the disk diameter to a smaller one compared to the case where the slits SLC are formed using the curved slits. Note that, this does not prevent the slits SLC of the track TC from being formed by the curved slits and it may also be possible to form the slits SL of all the tracks T by the curved slits. Further, it may also be possible to form at least one or more of the plurality of the tracks TA-TC by the curved slits.

(1-2-2. Detectors 130A-130C)

Subsequently, the detectors 130A-130C are explained with reference to FIG. 2 to FIG. 5 and the optical detection mechanism using the detectors is explained more specifically.

(Optical Detection Mechanism)

As shown in FIG. 2, the detector 130A is disposed so as to face the track TA. The detector 130A constructs a first optical detection mechanism together with the track TA. The detector 130B is disposed so as to face the track TB. The detector 130B constructs a second optical detection mechanism together with the track TB. The detector 130C is disposed so as to face the track TC. The detector 130C constructs a third optical detection mechanism together with the track TC.

The respective optical detection mechanisms by the detectors 130A-130C are common in each having the independent diffraction interference optical system, and the like, as described previously. Consequently, here, one of the optical detection mechanisms is explained as an example, and points different for each optical detection mechanism are described later individually.

In the present specification, the detectors 130A-130C, the tracks TA-TC, and the rotating gratings LA-LC are also called simply "detector 130", "track T", and "rotating grating L", respectively. In addition, the slits (slits SLA-SLC) included in the rotating grating L are also called simply "slits SL". Further, the pitch (pitches $p_{LA}$-$p_{LC}$) of the slits SL is also called simply "pitch $p_L$". Moreover, the number of slits (numbers $n_A$-$n_C$ of slits) is also called simply "number n of slits". Further, the number of cycles (numbers $m_A$-$m_C$ of cycles) of the period signals obtained from the optical detection mechanism is also called simply "number m of cycles".

Figure 4:
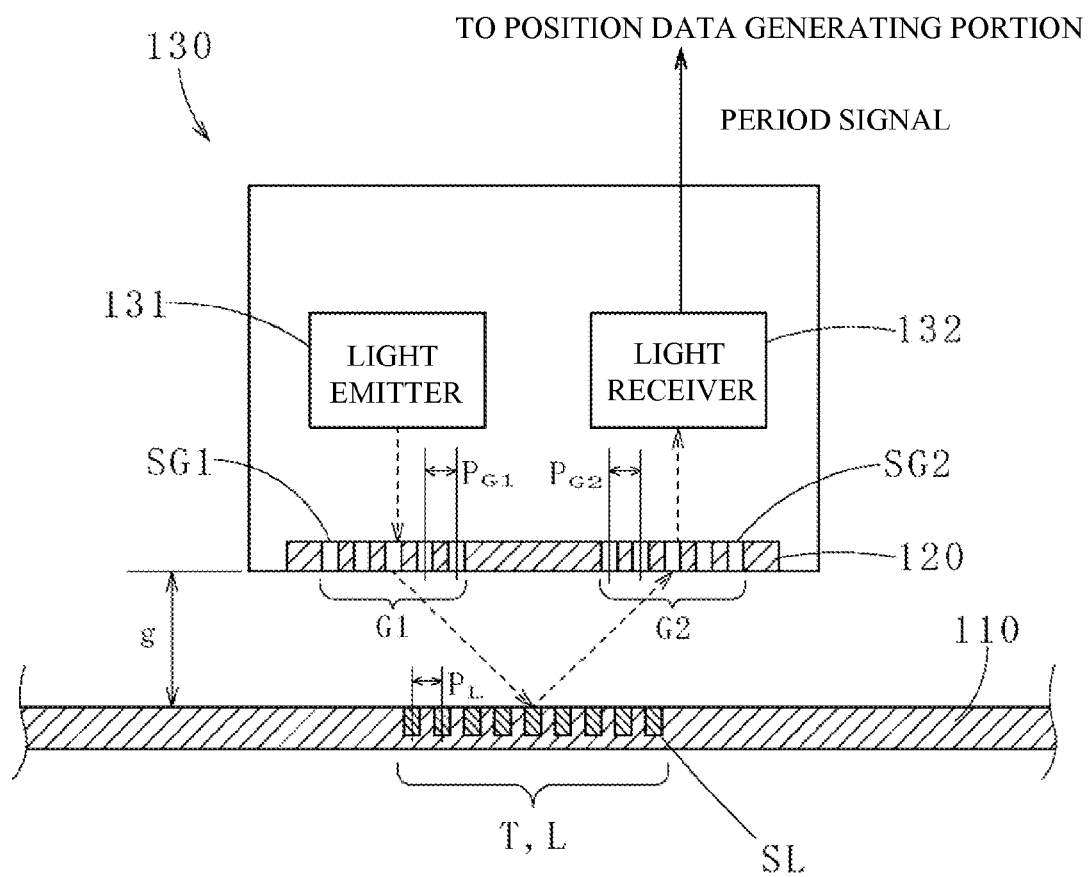
FIG. 4 is an operation principle diagram showing operation principles of an optical detection mechanism of the encoder.

As shown in FIG. 4, the detector 130 has the mask 120, a light emitter 131, and a light receiver 132. Note that, because FIG. 4 is an operation principle diagram for explaining the operation principles of the optical detection mechanism, the disposition relationship of each element constructing the optical detection mechanism is different from an actual one.

The mask 120 is disposed so as to face the disk 110 with the gap g in between. The mask 120 is fixed on a frame body constructing the encoder 100. That is, the disk 110 rotates relative to the mask 120. The mask 120 is formed of a material that blocks light. The mask 120 has two optical fixed gratings G1 and G2 (fixed diffraction gratings) having a plurality of slits SG1 and a plurality of slits SG2 which transmit light, respectively. In other words, the mask 120 transmits light through the slits SG1 and SG2 of the fixed gratings G1 and G2. The fixed gratings G1 and G2 construct a diffraction interference optical system of three gratings together with the rotating grating L. Hereinafter, the fixed grating G1 is called a primary fixed grating and the fixed grating G2 a secondary fixed grating.

The primary fixed grating G1 and the secondary fixed grating G2 are formed in the same mask 120. However, the primary fixed grating G1 and the secondary fixed grating G2 may be formed in the separate masks 120. In the case where the gratings are formed in the separate masks 120, it is desirable to dispose the primary fixed grating G1 and the secondary fixed grating G2 in the manner that a distance (gap g) between the primary fixed grating G1 and the rotating grating L and a distance (gap g) between the rotating grating L and the secondary fixed grating G2 are equal on the same surface side of the disk 110.

By using the two fixed gratings G1 and G2 equidistant from the rotating grating L and using the reflection-type slit as the slit SL of the rotating grating L as described above, the gaps g of both the fixed gratings G1 and G2 are fixed even if the positional relationship between the disk 110 and the detector 130 fluctuates. Consequently, it is possible to reduce the influence of fluctuations of the gap g on the diffraction interference optical system.

Here, the relationship between the gaps g (examples of the first to third gaps, respectively) of the detectors 130A-130C of the respective optical detection mechanisms is explained.

In the present embodiment, the pitches $p_{LA}$-$p_{LC}$ of the slits SLA-SLC of the respective tracks TA-TC are set to the pitch $p_L$ so as to be substantially equal to one another, and therefore, it is possible to set each gap g between each of the detectors 130A-130C and the disk 110 so as to be substantially equal to one another as shown in FIG. 2.

In the case where the gaps g between the detectors 130A-130C and the disk 110 are set so as to be substantially equal to one another as described above, it is possible to design or develop in common the diffraction interference optical system in accordance with the gap g for each of the detectors 130A-130C.

Further, by forming the respective masks 120 (first to third masks) of the detectors 130A-130C shown in FIG. 4 into an integrated unit, it is possible to adjust the gaps g when manufacturing (assembling) the encoder 100 at a time for the respective detectors 130A-130C. Consequently, manufacture of the encoder 100 is facilitated.

Note that, such working and effects are obtained similarly by simply making the same the gaps g between any two of the rotating gratings LA-LC and the fixed gratings G1 and G2 corresponding thereto. However, it is desirable for the optical detection mechanism in which the gaps g are made the same to be an optical detection mechanism in which the pitches $p_L$ of the track T are set so as to be equal to one another.

Subsequently, the light emitter 131 and the light receiver 132 are explained and the fixed gratings G1 and G2 are also explained, respectively.

As shown in FIG. 4, the light emitter 131 has a light source and emits light toward the primary fixed grating G1 formed in the mask 120. The wavelength and intensity of light emitted by the light emitter 131 are not limited in particular. However, the wavelength and intensity of light are appropriately determined according to the characteristics of the diffraction interference optical system, required positional resolution, and the like. Moreover, as light to be emitted, diffusion light is used in the present embodiment. By using diffusion light, each of the slits SG1 in the primary fixed grating G1, to be described later, can be regarded as substantially a line light source. As a result of that, the diffraction interference effect is heightened. Note that, if the slit SG1 can be regarded as substantially a line light source as above, it is also possible to use parallel light, laser light, converging light, or the like as light to be emitted. It may also be possible for the light emitter 131 to have an optical element, such as a diffusion lens, according to the characteristics, and the like, of light to be used (for example, parallel light, laser light, converging light, or diffusion light).

The primary fixed grating G1 is formed in a position where light emitted by the light emitter 131 enters. The primary fixed grating G1 has a plurality of slits SG1 of transmission type. The plurality of slits SG1 diffracts incident light. As a result of that, light that passes through each of the slits SG1 and is emitted to the disk 110 is converted into light with each of the slits SG1 as substantially a line light source.

Note that, the pitch $p_{G1}$ between the plurality of slits SG1 formed in the primary fixed grating G1 is formed so as to satisfy a relationship of "$p_{G1}=i \times p_L$ (i=1, 2, 3 ...)" for the pitch $p_L$ between the plurality of slits SL of the rotating grating L.

Here, in the case of "i=1, 2" in particular, the strength of a period signal that is obtained is high in many cases. Further, in the case of "i=2", the strength of a period signal is higher than that in the case of "i=1" in many cases. On the other hand, the number m of cycles of the period signal changes depending not only on the number n of slits but also on "i". Specifically, at least in the case of "i=1, 2", the number m of cycles becomes "m=2×n/i". In the following, for convenience of explanation, the case of "i=2", that is, "$p_{G1}=2p_L$" and "m=n", is explained.

Note that, light having passed through the primary fixed grating G1 spreads in the width direction of the primary fixed grating G1 in accordance with the incidence angle when entering the primary fixed grating G1. Consequently, it is desirable to set the width of the slit SL of the rotating grating L to a width greater than the width of the slit SG1 of the primary fixed grating G1 in order to increase the signal strength in view of the spread angle. At this time, by setting the width of the slit SL of the rotating grating L to a width greater than the width expected for light having passed through the primary fixed grating G1 to reach, the amount of light reflected by the slit SL of the transmission light increases, and therefore, fluctuations in the size of an image are suppressed. Alternatively, by setting the width of the slit SL of the rotating grating L to a width narrower than the width expected for light having passed through the primary fixed grating G1 to reach, the transmission light is reflected in the peak position where the amount of transmission light through the slit SL is large, and therefore, even if the position of the slit SL is shifted somewhat, fluctuations in the size of an image formed by the light reflected by the slit SL are suppressed. That is, by setting the width to a width greater or narrower than the width expected for light having passed through the primary fixed grating G1 to reach, it is possible to further improve the stability of a signal against an error in attaching the primary fixed grating G1 and the rotating grating L.

In the same manner as described above, light reflected by the rotating grating L spreads in the width direction of the rotating grating L in accordance with the incidence angle when entering the rotating grating L. Consequently, it is also desirable to set the width of the slit SG2 of the secondary fixed grating G2, to be described later, to a width greater than the width of the slit SL of the rotating grating L in order to increase the signal strength in view of the spread angle. At this time, by setting the width of the slit SG2 of the secondary fixed grating G2 to a width greater or narrower than the width expected for light having reflected by the rotating grating L to reach, it is also possible to further improve the stability of a signal against an error in attaching the secondary fixed grating G2 and the rotating grating L.

However, the relationships among the respective widths of the slits of the primary fixed grating G1, the secondary fixed grating G2, and the rotating grating L are not limited in particular if a sufficient signal strength can be secured and the stability of a signal against an error in attachment can also be secured sufficiently.

It is desirable to form the plurality of slits SG1 of the primary fixed grating G1 so as to be substantially parallel to the slits SL in the faced positions in order to heighten the diffraction interference effect of the diffraction interference optical system formed together with the rotating grating L and the secondary fixed grating G2 and to reduce noise.

That is, as shown in FIG. 3, the slits SLA and SLB of the rotating gratings LA and LB are curved slits, and therefore, it is desirable to form the plurality of slits SG1 of the primary fixed grating G1 and the plurality of slits SG2 of the secondary fixed grating G2 of the detectors 130A and 130B also by curved slits. On the other hand, the slits SLC of the rotating grating LC are radial slits, and therefore, it is desirable to form the plurality of slits SG1 and SG2 of the fixed gratings G1 and G2 of the detector 130C also by radial slits.

Figure 5:
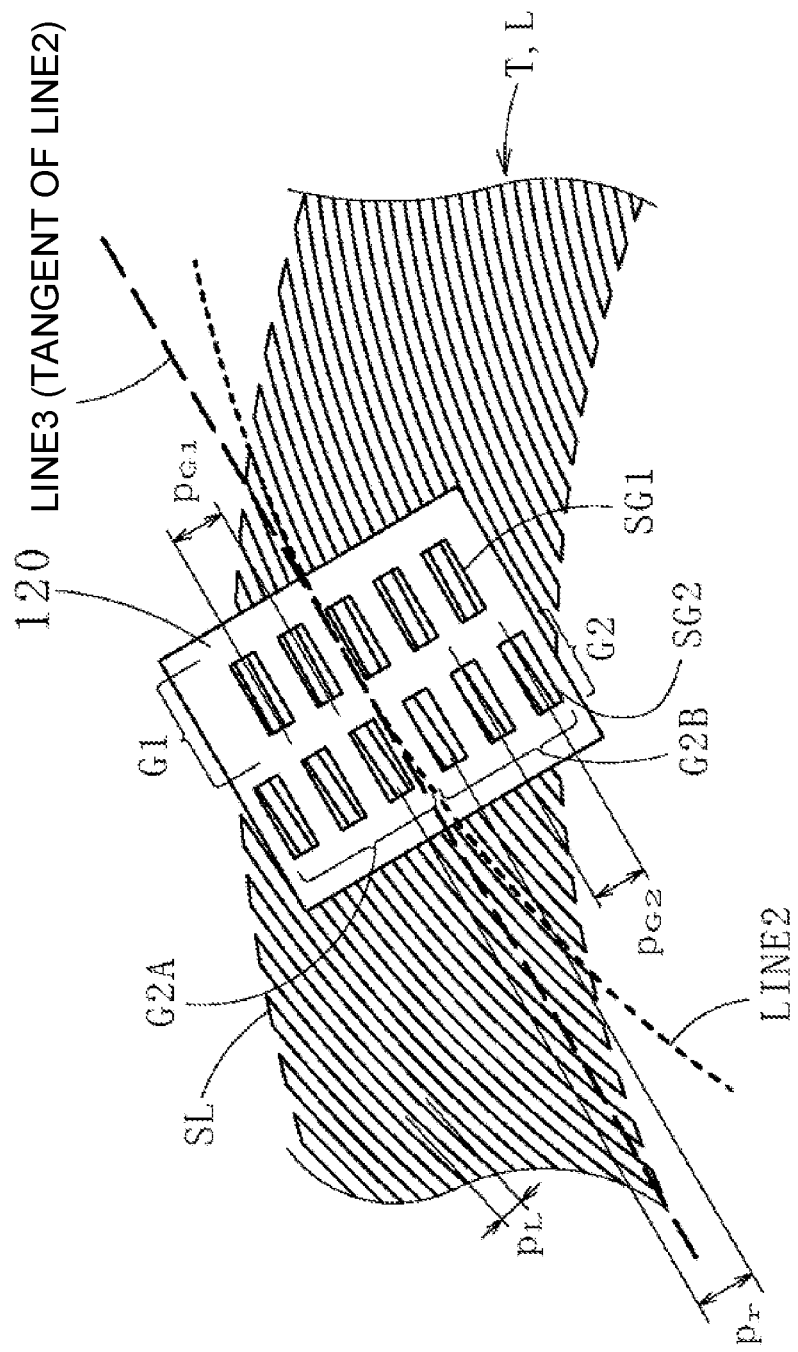
FIG. 5 is a disposition diagram showing a disposition of a mask and a track of the encoder.

In this case, as also described about radial slits in Patent Document 1, the pitch $p_L$ of the radial slits is sufficiently short compared to the length of the whole circumference of the track T, and therefore, it is possible to optically regard the radial slits as parallel slits. Consequently, it is possible to form the plurality of slits SG1 of the primary fixed grating G1 of the detector 130C corresponding to the radial slits as "parallel slits" adjacent in parallel to each other. It is desirable to dispose the parallel slits (the plurality of slits SG1 corresponding to radial slits) so as to be parallel to the parallel slits in the case where the radial slits are regarded as parallel slits. Similarly, it is also possible to form the plurality of slits SG1 of the primary fixed grating G1 of the detectors 130A and 130B corresponding to curved slits as parallel slits, as shown in FIG. 5. It is desirable to dispose the parallel slits (the plurality of slits SG1 corresponding to curved slits) so as to be substantially parallel to a tangent LINE3 of a LINE2 (to be described later) agreeing with the direction in which each curved slit extends, as shown in FIG. 5.

By forming both the primary fixed gratings G1 corresponding to the radial slits and the curved slits as parallel slits, it is made possible to use the slits in common. As a result of that, it is possible not only to further facilitate manufacture, and the like, but also to reduce the manufacture cost.

As shown in FIG. 4, light diffracted by the primary fixed grating G1 is emitted to the rotating grating L corresponding to the primary fixed grating G1. The light emitted to the rotating grating L is reflected by the slits SL of the rotating grating L. At this time, the light reflected is further diffracted by the rotating grating L. Then, the light diffracted by the rotating grating L is emitted to the secondary fixed grating G2.

The secondary fixed grating G2 is formed in a position where light diffracted by the rotating grating L enters. A pitch $p_{G2}$ of the slits SG2 formed in the secondary fixed grating G2 is set to the same as the pitch $p_{G1}$ of the slits SG1 formed in the primary fixed grating G1. That is, in the present embodiment, "$p_{G1}=p_{G2}=2\times p_L$" holds. Further, the shape of the slit SG2, the positional relationship between the slit SG2 and the slits SLA and SLB of the rotating gratings LA and LB, and the like, are similar to those of the slits SG1 of the primary fixed grating G1 described above. Consequently, detailed explanation thereof is omitted.

Note that, different from the primary fixed grating G1, the secondary fixed grating G2 is divided into two or more regions (for example, regions G2A and G2B shown in FIG. 5). The pitch $p_{G2}$ of the slits SG2 in each region is formed so as to be the same in the region. The pitch between the adjacent slits SG2 with the boundary of the regions sandwiched in between (for example, a boundary part pitch pr shown in FIG. 5) is set to a pitch longer (or shorter) than the pitch $p_{G2}$ by "$p_{G2}/4$". Note that, for convenience of explanation, in the following, a case where the secondary fixed grating G2 is divided into the two regions G2A and G2B as shown in FIG. 5 is explained.

The light emitted to the secondary fixed grating G2 forms an interference pattern in which light diffracted by each of the plurality of slits SL of the rotating grating L interferes with each other. The positions of bright parts in the interference pattern move as a result according to a change in the positional relationship between the primary fixed grating G1 and the rotating grating L when the disk 110 rotates. As a result of that, the intensities of light that pass through the respective slits SG2 of the regions G2A and G2B increase/decrease in a sine-wave shape with an electric angle of 90° shifted, because the boundary part pitch pr is set to a pitch longer (or shorter) than the pitch $p_{G2}$ by "$p_{G2}/4$".

The light receiver 132 is disposed so as to receive the light having passed through the slits SG2 of the secondary fixed grating G2. The light receiver 132 has, for example, a light-receiving element, such as a photodiode. By the light-receiving element, the intensity of received light is converted into an electric signal. In this case, the light receiver 132 has, for example, two light-receiving surfaces in the manner that electric signals can be generated separately for each of the regions G2A and G2B.

An electric signal generated by the light receiver 132 becomes a periodic electric signal (also called a "period signal") in the shape of substantially a sine wave, which is repeated each time the disk 110 rotates an amount corresponding to the pitch p. The period signals corresponding to the regions G2A and G2B, respectively, become two period signals whose phases are shifted 90° as with the intensities of light passing through the slits SG2 formed in the region G2A and the region G2B, respectively.

The two period signals are also called an "A-phase period signal" and a "B-phase period signal", respectively. Then, the two period signals obtained in each of the first optical detection mechanism, the second optical detection mechanism, and the third optical detection mechanism are also collectively called "first detection signals", "second detection signals", and "third detection signals", respectively.

As described above, in the optical detection mechanism, a diffraction interference optical system of three gratings is constructed. Consequently, if an interference occurs due to the relationship with the pitches $P_L$, $P_{G1}$, $P_{G2}$, and the like, regardless of the size of the gap g, it is possible to detect a desired period signal.

Meanwhile, a geometric optics encoder receives light having simply passed through the slits SL, and therefore, if the gap g is increased in size, noise increases accordingly due to the influence of light of a diffraction component and a diffusion component. Hence, the gap g needs to be set small. In contrast to this, in the encoder 100 using such a diffraction interference optical system as described in the present embodiment, it is possible to make large the gap g between the fixed member and the rotating member. As a result of that, it is possible to increase the degree of freedom in designing or development and also to reduce the possibility of occurrence of such trouble that the fixed member and the rotating member interfere due to an impact, and the like.

Note that, in the present embodiment, the diffraction interference optical system of three gratings (the rotating grating L and the fixed gratings G1 and G2) is explained as an example as described previously. However, the present disclosure is not limited to this. For example, by using a band-shaped light receiving element having a light receiving surface in the position of each of the slits SG2 of the secondary fixed grating G2 in place of the secondary fixed grating G2, it is also possible to form a pseudo diffraction interference optical system of three gratings. Further, by using a band-shaped or linear light emitting element, or the like that emits light in the position of each of the slits SG1 of the primary fixed grating G1 in place of the primary fixed grating G1, it is also possible to form a pseudo diffraction interference optical system of three gratings. Besides, if it is possible to construct a similar diffraction interference optical system, the number of gratings is not limited in particular.

(1-2-3. Configuration of Curved Slit)

Subsequently, with reference to FIG. 5 and FIG. 6, curved slits used in the above-described rotating gratings LA and LB are explained in detail.

(Curved Slit in One Track T)

Figure 6:
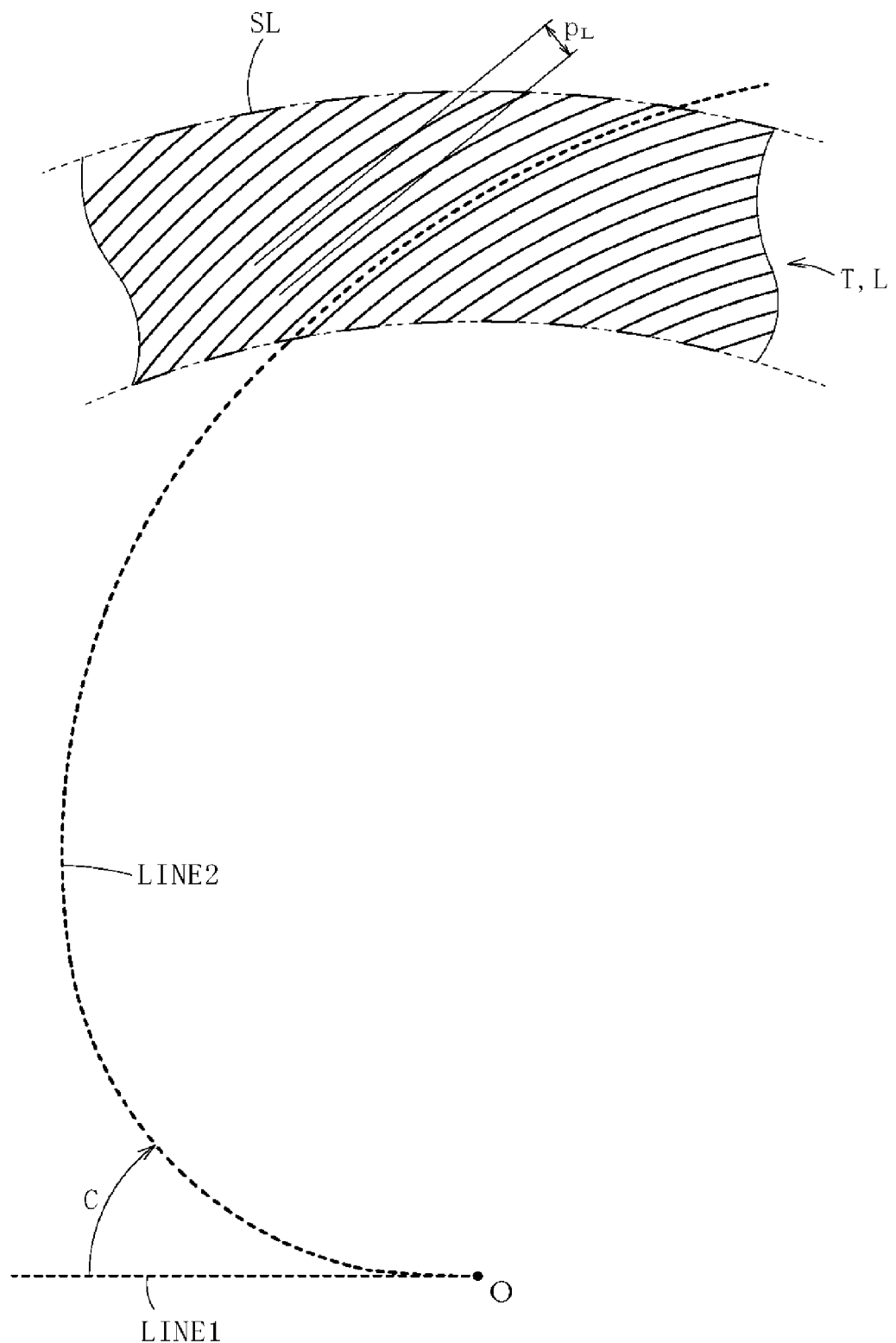
FIG. 6 is an explanatory diagram showing curved slits of the encoder.

First, with reference to FIG. 6, one of curved slits, that is, the slit SLA formed in the rotating grating LA of the track TA or the slit SLB formed in the rotating grating LB of the track TB is explained as an example. Different points between the slit SLA and the slit SLB will be explained individually.

The slits SL of the rotating grating L are arranged in the track T. As described previously, at least one or more slits SL of the rotating grating L are formed as curved slits in a curved shape different from radial slits. The slits SL are formed within an angle range exceeding 0 degrees and less than 360 degrees with the rotating axis AX as a center.

Specifically, the slit SL formed as a curved slit (here, simply called "slit SL") is formed along the LINE2 as shown in FIG. 6. The LINE2 is a curved line formed by curving the radial line LINE1 with the disk center O (the rotating axis AX) as a center at a predetermined curve degree C. in the circumferential direction.

Various formation examples of the slit SL along the curved line LINE2 as described above can be conceived. A formation example of the slit SL will be described as follows.

The radial lines LINE1 corresponding to the respective slits SL are set in the number corresponding to the number n of slits at predetermined divided angles obtained by dividing $2\pi$ (360°) of one rotation by the number n of slits to be arranged in the track T. By curving each radial line LINE1 at the same curve degree C. in the same circumferential direction, the curved line LINE2 of each slit SL is set. Each slit SL is formed with a predetermined width along the each curved line LINE2 set in this manner.

Further, a formation example of the slit SL is explained more specifically using expressions.

The disk center O is taken to be the origin, the distance from the origin to be d, the angle from the reference line passing through the origin to be $\theta$, and the inside diameter and the outside diameter of the track T to be $r_{IN}$ and $r_{OUT}$, respectively. Then, the number of slits included in the rotating grating L of the track T is taken to be n and it is assumed that each slit is identified by j (j=0, 1, 2, ..., n−1). Then, the radial line LINE1 is expressed in polar coordinates by the following expression 1.

$$\text{LINE1} = (d, j \times 2\pi/n) \quad \text{(Expression 1)}$$

where $r_{IN} \leq d \leq r_{OUT}$.

Then, in the case where the curve degree is taken to be C and the radius (radius in the center in the width direction of the track T) by which the pitch of a plurality of slits SL of the rotating grating L becomes the desired $p_L$ is taken to be $r_0$, the curved line LINE2 is expressed in polar coordinates by the following expression 2. The slits SL are formed in the predetermined width w ($=r_{OUT}-r_{IN}$) of the track T along the curved line LINE2.

$$\text{LINE2} = (r_0(1-C\theta), \theta + j \times 2\pi/n) \quad \text{(Expression 2)}$$

where $r_{IN} \leq r_0(1-C\theta) \leq r_{OUT}$.

Note that, in the case of the formation example of the curved slit, the curve degree C. is expressed by the following expression 3.

$$C = \tan[\sin^{-1}\{p_L \times n/(2\pi r_0)\}] \quad \text{(Expression 3)}$$

It is desirable to form the track T with the width w ($=r_{OUT}-r_{IN}$) by which the amount of light reflected by the rotating grating L, which has been received by the light receiving element after passing through the secondary fixed grating G2, becomes sufficient. In the diffraction interference optical system of the present embodiment, if the width w of the track T is set to, for example, about 20 to 50 times the pitch $p_L$ of the rotating grating L, a sufficient amount of light is obtained. Consequently, as will be seen from Expression 3, the slits SL as curved slits are formed in a range of 180° or less with the disk center O as a center. That is, each of the curved slits SL is formed so as not to circumferentially extend one rotation or more of the track T. By forming the curved slits in this manner, it is possible to increase the strength of the disk 110 and to facilitate formation of the slit SL.

In general, in such a diffraction interference optical system constructed by the rotating grating L of the present embodiment, the more the pitch of the plurality of slits SL included in the rotating grating L becomes uniform regardless of the position in the longitudinal direction of the slit L, the more noise in a sine-wave period signal to be obtained can be reduced, and the more the position detection precision can be improved. In other words, the smaller the amount of change in the pitch $p_L$ for the amount of movement in the case of movement from the center of the width w of the track T toward the inside or outside (inner circumference or outer circumference) of the track along the slit SL, the lower noise is suppressed and the more the detection precision is improved.

As to this point, according to the curved slit of the present embodiment, by forming the slit SL into a curved shape, it is possible to reduce the amount of change in pitch of the slit SL (here, also called a rate of change in pitch") in the formation direction of the slit SL (direction in which the curved line LINE2 extends). As a result, according to the encoder 100 of the present embodiment, it is possible to improve the position detection precision by improving the detection precision of the period signal obtained from each optical detection mechanism.

More specifically, for example, in the case of the radial slit, the slit SL is formed on the radial line LINE1 and the length of the slit SL in the formation direction (direction in which the radial line LINE1 extends) becomes substantially equal to the width w of the track T. As a result, the rate of change in pitch of the slit SL in the formation direction of the slit SL is comparatively large. This comparatively large rate of change in pitch causes a reduction in detection precision of a period signal. The smaller the number n of slits, the larger the magnitude of such a reduction in detection precision is. In contrast to this, in the case of the curved slit, it is possible to increase the length of the slit SL in the formation direction (curved line LINE2) by an amount of length corresponding to the curve degree C. compared to the case of the radial slit. As a result of that, it is possible to reduce the rate of change in pitch of the slit SL to a comparatively small rate and to improve the detection precision of the period signal.

Consequently, by using such curved slits in the encoder 100 according to the present embodiment, it is possible to set the plurality of tracks TA-TC having different numbers m of cycles of the period signals without lowering the degree of freedom in designing, development, and the like and without reducing the detection precision of the period signal. Consequently, according to the present embodiment, compared to the encoder in which no curved slit is used, it is possible to easily form the compact encoder 100 with high precision.

Further, in general, in the diffraction interference optical system, the optimum gap g between the rotating grating L and the fixed gratings G1 and G2 depends on a wavelength $\lambda$ of light emitted from the light emitter 131 and the pitch $p_L$ of the plurality of slits SL of the rotating grating L. For example, in the diffraction interference optical system of three gratings, in the case of $p_{G1}=p_L=p_{G2}$, the gap g becomes an optimum one when the following expression 4 is satisfied. In the case of $p_{G1}=2\times p_L=p_{G2}$, the gap g becomes an optimum one when the following expression 5 is satisfied. Here, k is a positive integer.

$$g=(2\times k-1)\times p_L^2/4\lambda \quad \text{(Expression 4)}$$

$$g=(2\times k)\times p_L^2/\lambda \quad \text{(Expression 5)}$$

Here, according to the curved slit as in the present embodiment, the pitch $p_L$ of the plurality of slits SL is expressed by, for example, the expression 6 using a function f of the number n of slits, the track radius r ($r=r_0$), and the curve degree C.

$$p_L=f(n,r,C)=(2\pi r/n)\times\sin(\tan-1 C) \quad \text{(Expression 6)}$$

Consequently, only by appropriately setting the curve degree C. without changing the number n of slits (that is, corresponding to the cycles of the period signals) or the track radius r, it is made possible to set the pitch p to an optimum value for constructing a diffraction interference optical system. As a result of that, it is made possible to freely set the number n of tracks, the track radius r, and the like, and it is made easy to achieve miniaturization, and designing, development, and the like are also facilitated.

Meanwhile, in the case where the slits SL as described in Patent Document 3 are formed so as to circumferentially extend one rotation or more in the track T, different from the present embodiment, such slits are also called "multiple spiral slits". In the case of such multiple spiral slits, the number of slits SL stacked in the radial direction increases and the width w of the track T becomes great, and therefore, miniaturization becomes difficult to achieve. Consequently, the degree of freedom in designing and development decreases and as a result, manufacture itself becomes difficult. In contrast to this, the slits SL according to the present embodiment are formed by curved slits the number of rotations of which is less than one rotation, not by the multiple spiral slits. As a result of that, as described previously, it is possible to facilitate manufacture and miniaturization by increasing the degree of freedom in designing and development. From a viewpoint of obtaining a higher signal precision, preferably, the number of rotations of the curved slit is equal to or less than half a rotation and more preferably, equal to or less than a quarter of a rotation.

Note that, the formation example of the curved slit, the expression of the curved line LINE2, and the like, explained here are mere examples. If it is possible to form the slits SL along the curved line LINE2 curved in the circumferential direction as described above, the formation method, the designing method, and the like, are not limited in particular.

(Positional Relationship Between Curved Slit and Slit on Fixed Grating Side)

In the case where parallel slits are used as the fixed gratings G1 and G2, as shown in FIG. 5, the fixed gratings G1 and G2 are disposed in the manner that the tangent LINE3 of the curved line LINE2 of the slit SL of the corresponding rotating grating L and each of the slits SG1 and SG2 are parallel to each other. Note that, "parallel" referred to here is not parallel in the strict sense of the word. That is, "parallel" means "substantially parallel" permitting an error in designing and manufacture (this also applies below). Specifically, for example, it is sufficient for each of the slits SG1 and SG2 to intersect with the tangent LINE3 in a range between −5 degrees and +5 degrees. When the curved slit as in the present embodiment is used, even in the case where the disposition positions of the fixed gratings G1 and G2 are shifted somewhat, the rate of change in the pitch of the curved slit is comparatively small, and therefore, it is possible to secure a large region in which the fixed gratings G1 and G2 as parallel slits and the rotating grating L can be regarded to be parallel to each other. Consequently, it is possible to facilitate manufacture and the like considerably while further improving the detection precision of the period signal.

(Curved Slit in Relationship Between a Plurality of Tracks)

Subsequently, curved slits in the relationship between the plurality of tracks TA and TB are explained with reference to FIG. 2 and FIG. 3.

In the present embodiment, as shown in FIG. 2, the gaps g between the rotating gratings LA-LC of all the tracks TA-TC and the masks 120 of the detectors 130A-130C corresponding thereto are set substantially equal. On the other hand, in order to form a diffraction interference optical system, it is important to set the pitch $p_L$ of the slits SL corresponding to the gap g so as to satisfy the expression 4 or the expression 5 described above.

Consequently, in the present embodiment, the curve degree C. in the slit SLA of the track TA is set in the manner that, as shown in FIG. 3, the pitch $p_{LA}$ of the slit SLA becomes equal to the pitch $p_{LC}$ of the slit SLC of another track TC. Similarly, the curve degree C. in the slit SLB of the track TB is also set in the manner that the pitch $p_{LB}$ of the slit SLB becomes equal to the pitch $P_{LC}$ of the slit SLC.

On the other hand, as described previously, the number $n_A$ of slits of the track TA is smaller than the number $n_B$ of slits of the track TB by one.

As a result of the above, it is made possible to make the pitches $p_{LA}$-$p_{LC}$ of the slits SLA-SLB in all of the tracks TA-TC substantially equal to one another. Note that, "equal" referred to here is not equal in the strict sense of the word. That is, "equal" means "substantially equal" permitting an error in designing and manufacture (this also applies below). Specifically, for example, an error may exist in the pitches $p_{LA}$-$p_{LC}$ in a range between −10% and +10%. Consequently, it is possible to dispose the detectors 130A-130C with the gaps g being equal while each forming a diffraction interference optical system. Note that, for example, an error may exist in the gap g in a range between −10% and +10%. In the case where it is possible to form the plurality of detectors 130A-130C with the equal gap g as described above, adjustment in the gap g direction of the detectors 130A-130C is facilitated. Further, it is also made possible to integrally form the detectors 130A-130C. In the case where the detectors 130A-130C are formed integrally, it may also be possible to integrally form the masks 120 of the respective detectors into one mask. In this case, it is possible to improve the degree of freedom in designing and the like and to facilitate manufacture.

(1-2-4. Position Data Generating Portion)

Subsequently, the position data generating portion 140 is explained.

As described previously, the position data generating portion 140 acquires the first detection signal, the second detection signal, and the third detection signal each having a sine-wave shape from the detectors 130A-130C, respectively. That is, the position data generating portion 140 acquires two sine-wave signals in the A-phase and in the B-phase, respectively, for the first detection signal, the second detection signal, and the third detection signal (see FIG. 2).

Figure 7A:
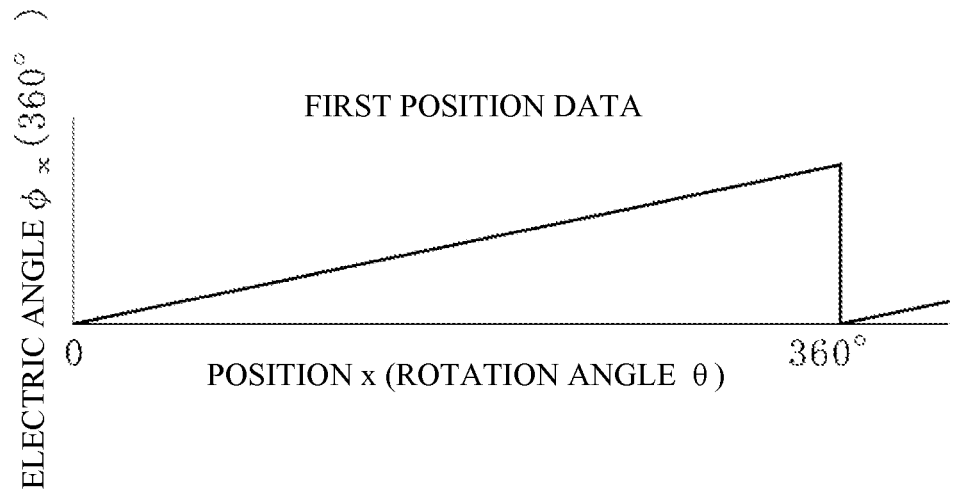
FIG. 7A is a graph showing first position data generated by a position data generating portion of the encoder.
Figure 7B:
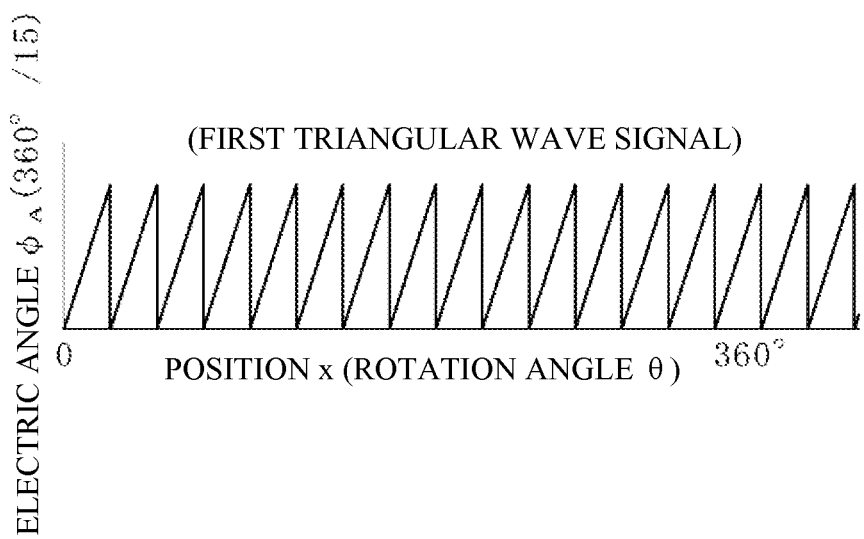
FIG. 7B is a graph showing a first triangular wave signal generated by the position data generating portion of the encoder.
Figure 7C:
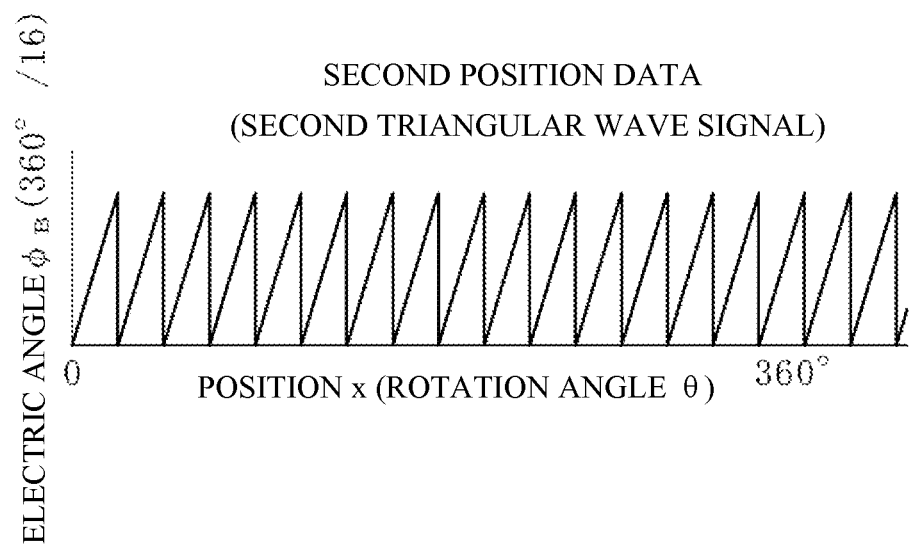
FIG. 7C is a graph showing second position data (second triangular wave signal) generated by the position data generating portion of the encoder.
Figure 7D:
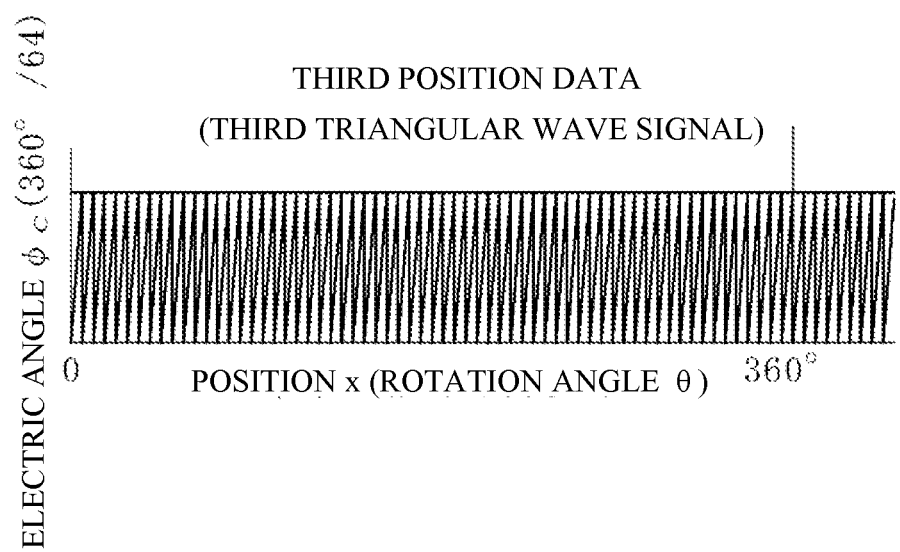
FIG. 7D is a graph showing third position data (third triangular wave signal) generated by the position data generating portion of the encoder.

The position data generating portion 140 generates first to third triangular wave signals (examples of period signals) that increase monotonically as shown in FIGS. 7B to 7D, respectively, from the first to third detection signals. The periods of the first to third triangular wave signals are the same as the periods of the first to third detection signals, respectively.

From the first and second triangular wave signals, the first position data shown in FIG. 7A is generated. The second and third triangular wave signals form the second and third position data shown in FIG. 7C and FIG. 7D, respectively.

Note that, the method for generating the first to third triangular wave signals by the position data generating portion 140 is not limited in particular. As methods for generating position data, mention is made, for example, of 1) a method for calculating an electric angle φ by performing the arctangent operation on the division result of two sine-wave signals in the A-phase and in the B-phase, 2) a method for converting two sine-wave signals into the electric angle φ using a tracking circuit, and 3) a method for specifying the electric angle φ associated with the values of the A-phase and the B-phase signal in a table created in advance. In addition, at this time, it is preferable for the position data generating portion 140 to generate the above-mentioned position data after performing analog-to-digital conversion of the two sine-wave signals in the A-phase and in the B-phase for each detection signal and then improving resolution by performing multiplication processing on the two converted digital signals.

The position data generating portion 140 specifies the absolute position x of the motor 200 from the first position data, the second position data, and the third position data that are generated and outputs position data representing the absolute position x.

Hereinafter, an example of processing to specify the absolute position x by the position data generating portion 140 is explained more specifically. Note that, in order to make understanding easy, the disk 110 is simplified and a disk is explained, in which the pitches are set so as to satisfy "$p_{G1}=2 \times p_L=p_{G2}$" and the numbers of slits SLA, SLB, and SLC are 15, 16, and 64, respectively.

As shown in FIG. 7A, in the first position data, an electric angle $\phi_x$(0° to 360°) monotonically increases (or decreases) once as the disk makes one rotation.

That is, the first position data is data approximately representing the absolute position x as the disk makes one rotation. Specifically, the first position data is generated as follows.

The number $n_A$ (=15) of slits SLA formed in the track TA of the first optical detection mechanism is smaller than the number $n_B$ (=16) of slits SLB formed in the track TB of the second optical detection mechanism by one. Consequently, when the disk makes one rotation, the first detection signal is output in the number of cycles smaller by one than that of the second detection signal. That is, when the disk makes one rotation, the first triangular wave signal shown in FIG. 7B is output in the number of cycles smaller by one than that of the second triangular wave signal shown in FIG. 7C. By subtracting the first triangular wave signal from the second triangular wave signal, as shown in FIG. 7A, an electric signal (first position data) in a triangular wave shape of one cycle is generated by the rotation absolute angle θ (the absolute position x) of the disk of 360°.

Note that, the method for generating the first position data by the position data generating portion 140 is not limited in particular.

The second position data and the third position data are the second and third triangular wave signals, respectively. As shown in FIG. 7C, in the second position data, as the disk makes one rotation, an electric angle $\phi_B$ (0° to 360°) monotonically increases (or decreases) 16 times (that is, the number $m_B$ of cycles=16). As shown in FIG. 7D, in the third position data, as the disk makes one rotation, an electric angle $\phi_C$(0° to 360°) monotonically increases (or decreases) 64 times (that is, the number $m_B$ of cycles=64).

Note that, FIG. 7A to FIG. 7D each show a signal that monotonically increases linearly. However, it may also be possible for the position data generating portion 140 to generate, for example, signals that monotonically increase stepwise as the first to third triangular wave signals.

The first to third position data represents the absolute position x with resolution in accordance with each of the numbers $m_A$, $m_B$, and $m_C$ of cycles. Consequently, the resolution of the third position data is higher than that of the second position data and the resolution of the second position data is higher than that of the first position data.

Consequently, the position data generating portion 140 calculates the absolute position x having the same level of resolution as that of the third position data having the highest resolution based on the first position data to the third position data. The first position data has a comparatively low resolution and represents the absolute position. It is possible for the position data generating portion 140 to calculate the absolute position x having the same level of resolution as that of the second position data by putting the position having a comparatively high resolution represented by the second position data on the absolute position represented by the first position data. Similarly, it is possible for the position data generating portion 140 to calculate the absolute position x having the same level of resolution as that of the third position data by putting the position represented by the third position data having a higher resolution on the absolute position x calculated from the second position data. In other words, as shown in FIG. 7A to FIG. 7D, the position data generating portion 140 converts the position represented by the third position data having the highest resolution into the absolute position x by sequentially using the second position data and the first position data (the vernier method).

Note that, it is also possible for the position data generating portion 140 to specify the absolute position x using a reference table, without performing such processing, by storing the reference table of the absolute position x for a combination of the first position data, the second position data, and the third position data. Further, the position data generating portion 140 may be provided in the controller 20.

1-3. Operation of Motor Unit According to First Embodiment

Subsequently, the operation of the motor system 1 according to the present embodiment is explained. Note that, the operation, working, and the like, in each configuration have been explained in the explanation of each configuration, and therefore, they are appropriately omitted in explanation.

The controller 20 acquires a higher-order control signal from a higher-order controller or the like, and further acquires position data representing the absolute position x of the motor 200 from the encoder 100. Then, the controller 20 outputs a drive current or voltage of the motor 200 based on the higher-order control signal and the position data.

As a result of that, the motor 200 rotates the rotating axis 201 based on the drive current or voltage. Then, the disk 110 of the encoder 100 coupled to the rotating axis 202 corresponding to the rotating axis 201 via the rotating axis 101 rotates. On the other hand, the detectors 130A-130C each detect the period signal in accordance with the rotation of the disk 110 and output the period signal to the position data generating portion 140. Then, the position data generating portion 140 generates position data based on the acquired signals and outputs the position data to the controller 20.

1-4. Method for Manufacturing Encoder According to First Embodiment

Subsequently, with reference to FIG. 8, the method for manufacturing the encoder 100 according to the present embodiment is explained.

As shown in FIG. 8, in the method for manufacturing the encoder 100, processing at step S101 is performed first. At step S101 (an example of a step of determining the number of slits), for one track T of the disk 110, the number m of cycles of a desired period signal to be obtained in one rotation is determined according to resolution desired to be obtained from the track T. Then, according to the cycles, the number n of slits to be formed in the track T is set. Then, the procedure proceeds to step S103.

At step S103 (an example of a step of setting radial lines), the radial lines LINE1 (see FIG. 6) in the number determined at step S101 are set at equal angles with the disk center O (rotating axis AX) as a center. Then, the procedure proceeds to step S105.

At step S105 (an example of a step of setting curved lines), the curve degree C. is set in the manner that the pitch $p_L$ of the slits SL becomes a desired value. Then, the plurality of radial lines LINE1 set at step S103 is curved in the same circumferential direction at the set curve degree C., and thereby, the plurality of curved lines LINE2 is set. However, in the case of radial slits, for example, such as the track TC, the curve degree C. is set to zero (meaning that the lines are not curved) at step S105 as a result.

Note that, at step S105, the curve degree C. is set in the manner that the pitch $p_L$ of the slits SL of the track T (an example of one track) to be formed becomes equal to the pitch $p_L$ of the slits SL of the track T already formed or the track T to be formed subsequently (an example of another track T) as a result. After the processing at step S105, the procedure proceeds to step S107.

At step S107 (an example of a step of forming slits), along the plurality of curved lines LINE2 set at step 105, the plurality of slits SL is formed in the track T with the width w determined in advance. Then, the procedure proceeds to step S109.

At step S109, whether or not the slits SL are formed in all of the desired plurality of tracks T is checked. Then, if there is a track T in which the slits SL are not formed yet, the processing at step 101 and subsequent steps is repeated. On the other hand, if all of the slits SL are formed, the procedure proceeds to step S111.

At step S111 (an example of a step of disposing a mask), for two or more tracks T in which at least the pitches $p_1$, are equal, the detector 130 including the mask 120 is disposed in the manner that the gaps g between the rotating grating L and the fixed gratings G1 and G2 become equal.

Note that, simultaneously with, or before or after the processing, processing to couple the rotary shaft 101 to the disk 110, processing to couple each of the detectors 130 and the position data generating portion 140, processing to house each configuration in a case and to support it fixedly or rotatably, and the like, are performed, and thereby, the encoder 100 is completed.

1-5. Example of Effect by Encoder Unit According to First Embodiment

In the encoder 100 and the like according to the present embodiment, the plurality of slits SL of at least one track T is formed as curved slits along the curved line LINE2. From the curved slits, it is possible to optically obtain the first position data approximately representing the absolute position x while the disk 110 makes one rotation and it is also possible to adjust the pitch $p_L$ of the curved slits by adjusting the curve degree C. of the curved line LINE2 without changing the formation position of the track T or the number n of slits included in the track T. Consequently, it is possible to increase the degree of freedom in designing, development, or the like.

In addition, as for the curved slits used in the encoder 100 and the like, it is possible to increase the length of each of the slits SL by an amount corresponding to the curve degree C. thereof. As a result of that, it is possible to reduce the amount of change in the slit formation direction of the pitch $p_L$ of the slits SL. This means that it is possible to make uniform the pitch $p_L$ of each of the slits SL in the slit formation direction, that is, it is possible to make each slit SL as a curved slit become close to a parallel slit. On the other hand, the encoder 100 according to the present embodiment utilizes a diffraction interference optical system utilizing the curved slits. In the diffraction interference optical system, the more the plurality of slits SL becomes close to parallel slits, the more it is possible to improve the S/N ratio of a detection signal and the like, and the more to improve detection precision. Consequently, in the encoder 100 according to the present embodiment, it is possible to improve the S/N ratio of a detection signal and the like and further to improve detection precision because it is possible to make the plurality of slits SL become close to parallel slits by forming the curved slits in the disk 110.

Consequently, according to the encoder 100 of the present embodiment, it is made possible to perform designing, development, or the like, so as to facilitate manufacture by using diffraction interference light and by reducing restrictions and the like at the time of designing or development when constructing a diffraction interference optical system while improving detection precision.

Such an effect is particularly effective in the case where the track radius r is set to be large or where the number m of cycles of the period signal is set to be small. That is, usually, if the track radius r is increased, it is necessary to sufficiently reduce the pitch $p_L$ of the slits SL so as to enable formation of the diffraction interference optical system. As a result, the number n of slits needs to become large inevitably, and therefore, the number m of cycles of the period signals corresponding to the number n of slits also increases. On the other hand, similarly, in the case where the number m of cycles is reduced, in contrast to the above, the track radius r needs to be reduced inevitably. However, in the encoder 100 according to the present embodiment, it is possible to independently adjust the number n of slits or the track radius r by adjusting the curve degree C. as described previously. Consequently, it is also possible to perform miniaturization and the like by considerably reducing restrictions at the time of designing or development.

In addition, according to the absolute-value encoder 100 of the present disclosure, it is possible to make equal the pitches $p_L$ in two or more tracks T by forming curved slits in at least one or more tracks T. As a result of that, it is possible to make equal the gaps g between the detectors 130 (that is, the masks 120) for the tracks T and the tracks T.

Consequently, it is possible to perform designing, development, and the like, of the diffraction interference optical system for the tracks T substantially in the same manner, and to collectively adjust the gaps g for the detectors 130 corresponding to the tracks T. Consequently, it is possible to considerably facilitate manufacture (including the processes of designing and development).

2. Second Embodiment

Subsequently, a motor unit according to a second embodiment of the present disclosure is explained with reference to FIG. 9.

In the first embodiment of the present disclosure described above, the case where the directions in which the slits SLA and SLB of the tracks TA and TB formed as curved slits are curved are the same circumferential direction as shown in FIG. 3 is explained. However, the present disclosure is not limited to the example and it is also possible to make the curve directions of adjacent tracks opposite to each other in the circumferential direction. Therefore, here, as the second embodiment of the present disclosure, the case where the curve directions of adjacent tracks are set opposite to each other in the circumferential direction is explained as an example. Note that, the encoder according to the present embodiment and the like have the same configuration as that of the first embodiment described above except in that the curve directions of tracks are set opposite to each other in the circumferential direction, and therefore, differences from the first embodiment are explained mainly here.

Figure 9:
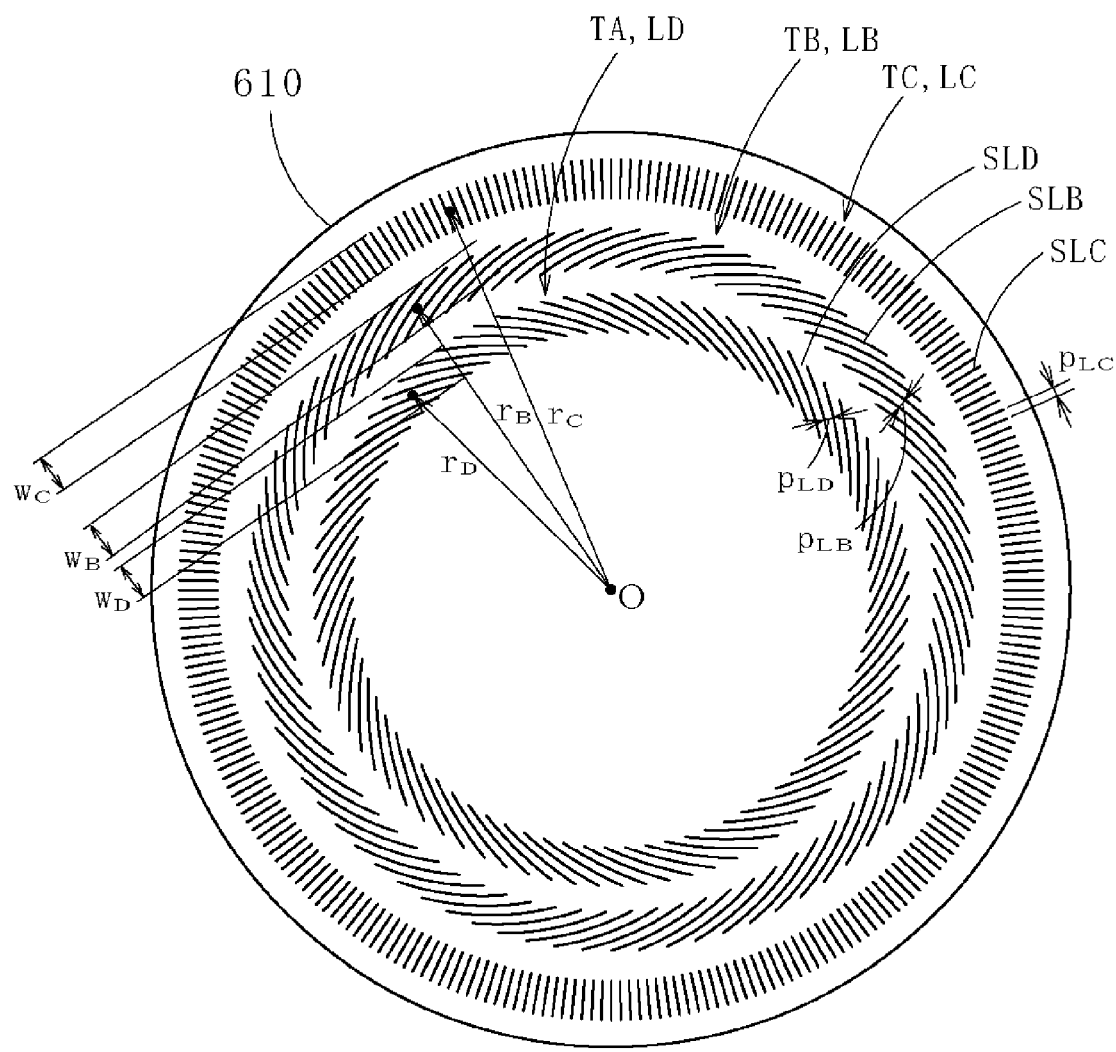
FIG. 9 is an explanatory diagram showing a disk of an encoder according to a second embodiment of the present disclosure.

As shown in FIG. 9, a disk 610 of the encoder according to the present embodiment has a rotating grating LD in place of the rotating grating LA shown in FIG. 3 in the track TA (an example of at least one track). Then, the rotating grating LD has a plurality of slits SLD.

Different from the slit SLA shown in FIG. 3, the curve direction of the slit SLD is set in the circumferential direction opposite to the curve direction of the slit SLB of the adjacent track TB (an example of another track). That is, while the slit SLB is formed along the curved line LINE2 formed by curving the radial line LINE1 in the clockwise direction, the slit SLD is formed along a curved line formed by curving the radial line LINE1 in the counterclockwise direction, opposite to the former case.

On the other hand, diffraction interference light generated from each of the slits SL forms an interference pattern that repeats in a direction substantially at a right angle with respect to the longitudinal direction of each of the slits SL. Consequently, the longitudinal direction of the slit SL as the curved slit is curved in the circumferential direction, and therefore, there is a case where the interference pattern is formed so as to repeat in the direction of an adjacent track. As a result of that, it is feared that a crosstalk occurs between the interference pattern and the diffraction interference optical system of the adjacent track. Further, there is a case where designing or development of the encoder may be restricted in order to prevent such a crosstalk.

In such a case, by setting the curve directions of each of the slits SLD and SLB of the adjacent tracks TA and TB in the directions opposite to each other as in the present embodiment, it is made possible to change the direction in which the interference pattern is formed, and therefore, it is possible to easily perform designing or development so as to prevent a crosstalk from occurring.

Note that, needless to say, also in the present embodiment, it is possible to obtain other special working, effect, and the like, obtained in the first embodiment described above.

As above, the embodiments of the present disclosure are explained in detail with reference to the drawings. However, it is needless to say that the present disclosure is not limited to the examples of the embodiments. It is obvious that persons who have common knowledge in the technical field to which the present disclosure pertains could have conceived of various alterations and modifications in the scope of the technical idea described in claims. Consequently, the technologies after alterations and modifications should be naturally regarded to belong to the technical scope of the present disclosure.

Note that, among the plurality of tracks, the pitches of at least two or more tracks may be substantially equal, or a track with a different pitch may be included.

In the present specification, the steps described in the flowchart include processing that is performed time-sequentially in the described order, and also processing that is performed in parallel or individually even if not necessarily performed time-sequentially. It is also possible to appropriately change the order of steps performed time-sequentially in some cases.

What is claimed is:

1. An encoder comprising:
a disk disposed rotatably about a rotating axis and including a first track and a second track in which a first rotating grating and a second rotating grating are formed, respectively; and
a first detector and a second detector disposed so as to face the first track and the second track, including a first fixed grating constructing as first diffraction interference optical system together with the first rotating grating and a second fixed grating constructing a second diffraction interference optical system together with the second rotating grating, respectively, and configured to detect a first detection signal and a second detection signal from the first diffraction interference optical system and the second diffraction interference optical system, respectively,
at least one of the first rotating grating and the second rotating grating includes a plurality of curved slits in a curved shape, and
an absolute value of the disk is obtained based on a difference in the number of slits between the first rotating grating and the second rotating grating,
further comprising a position data generating portion configured to generate first position data representing an absolute position of the disk during one rotation and second position data having a resolution higher than that of the first position data based on the first detection signal and the second detection signal, and to specify the absolute position of the disk with a resolution higher than that of the first position data based on the first position data and the second position data, wherein:
the first rotation grating and the second rotation grating includes a first curved slit and a second curved slit, respectively, and curve degrees of the first curved slit and the second curved slit are set respectively in the manner that pitches of the first curved slit and the second curved slit are substantially equal.

2. The encoder according to claim 1, wherein:
the difference in the number of slits between the first rotating grating and the second rotating grating is one.

3. The encoder according to claim 1, wherein:
the curved slits are formed along curved lines formed by curving a plurality of radial lines extending from the rotating axis in radial directions of the disk toward circumferential directions at curve degrees determined in advance, respectively.

4. The encoder according to claim 1, wherein:
the curved slits are formed within an angle range exceeding 0 degrees and less than 360 degrees with the rotating axis as a center.

5. The encoder according to claim 1, wherein:
a first gap between the first rotating grating and the first fixed grating and a second gap between the second rotating grating and the second fixed grating are substantially equal in size.

6. The encoder according to claim 1, wherein:
the first curved slits are curved in a circumferential direction opposite to the direction in which the second curved slits are curved.

7. The encoder according to claim 1, wherein:
the first curved slit and the second curved slit are reflection slits, respectively, and
the first fixed grating and the second fixed grating are disposed on the same surface side of the disk, respectively.

8. The encoder according to claim 7, wherein:
the disk further includes a third track on the outermost periphery, in which a third rotating grating is formed and which is configured to determine a maximum resolution of the encoder,
a plurality of radial lines extending in a radial direction at angular intervals determined in advance with the rotating axis as a center is set in the disk, and
the third rotating grating includes radial slits extending along the radial lines.

9. The encoder according to claim 8, wherein:
pitches of the radial slits and the first and second curved slits are substantially equal.

10. The encoder according to claim 8, wherein:
slits being included in the first fixed grating and the second fixed grating are substantially parallel to tangents of curved lines along which the first curved slit and the second curved slit curve, respectively.

11. A servomotor comprising:
a motor configured to rotate a rotary shaft; and
an encoder configured to measure an absolute position of the rotary shaft;
the encoder comprising:
   a disk disposed rotatably about a rotating axis of the rotary shaft and including a first track and a second track in which a first rotating grating and a second rotating grating are formed, respectively; and
   a first detector and a second detector disposed so as to face the first track and the second track, including a first fixed grating constructing a first diffraction interference optical system together with the first rotating grating and a second fixed grating constructing a second diffraction interference optical system together with the second rotating grating, respectively, and configured to detect a first detection signal and a second detection signal from the first diffraction interference optical system and the second diffraction interference optical system, respectively,
at least one of the first rotating grating and the second rotating grating includes a plurality of curved slits in a curved shape, and
an absolute value of the disk is obtained based on a difference in the number of slits between the first rotating grating and the second rotating grating,
the encoder further comprising a position data generating portion configured to generate first position data representing an absolute position of the disk during one rotation and second position data having a resolution higher than that of the first position data based on the first detection signal and the second detection signal, and to specify the absolute position of the disk with a resolution higher than that of the first position data based on the first position data and the second position data, wherein:
the first rotating grating and the second rotating grating includes a first curved slit a second curved slit, respectively, and curve degrees of the first curved slit and the second curved slit are set respectively in the manner that pitches of the first curved slit and the second curved slit are substantially equal.

12. A motor unit comprising:
a motor configured to rotate a rotary shaft;
an encoder configured to measure a position of the rotary shaft; and
a controller configured to control rotation of the motor based on the position detected by the encoder;
the encoder comprising:
   a disk disposed rotatable about a rotating axis of the rotary shaft and including a first track and a second track in which a first rotating grating and a second rotating grating are formed, respectively; and
   a first detector and a second detector disposed so as to face the first track and the second track, including a first fixed grating constructing a first diffraction interference optical system together with the first rotating grating and a second fixed grating constructing a second diffraction interference optical system together with the second rotating grating, respectively, and configured to detect a first detection signal and a second detection signal from the first diffraction interference optical system and the second diffraction interference optical system, respectively,
at least one of the first rotating grating and the second rotating grating includes a plurality of curved slits in a curved shape, and
an absolute value of the disk is obtained based on a difference in the number of slits between the first rotating grating and the second rotating grating,
the encoder further comprising a position data generating portion configured to generate first position data representing an absolute position of the disk during one rotation and second position data having a resolution higher than that of the first position data based on the first detection signal and the second detection signal, and to specify the absolute position of the disk with a resolution higher than that of the first position data based on the first position data and the second position data, wherein:
the first rotating grating and the second rotating grating includes a first curved slit and a second curved slit, respectively, and curve degrees of the first curved slit and the second curved slit are set respectively in the manner that pitches of the first curved slit and the second curved slit are substantially equal.

13. An encoder comprising:
a disk disposed rotatably about a rotating axis and including a first track and a second track in which a first rotating grating and a second rotating grating are formed, respectively; and
a first detector and a second detector disposed so as to face the first track and the second track, including a first fixed grating constructing a first diffraction interference optical system together with the first rotating grating and a second fixed grating constructing a second diffraction interference optical system together with the second rotating grating, respectively, and configured to detect a first detection signal and a second detection signal from the first diffraction interference optical system and the second diffraction interference optical system, respectively,
at least one of the first rotating grating and the second rotating grating includes a plurality of curved slits in a shape being along curved lines formed by curving a plurality of radial lines extending from the rotating axis in radial directions of the disk toward circumferential directions at curve degrees, C, determined based on a following equation:

$$C = \tan(\sin^{-1}\{p \times n/(2\pi r_0)\}),$$

where n is a number of the curved slits in a respective track, p is a pitch of the curved slits in the respective track, and r is a radius of the respective track about the rotating axis, and an absolute value of the disk is obtained based on a difference in the number of slits between the first rotating grating and the second rotating grating.

14. The encoder according to claim 13, further comprising a position data generating portion configured to generate first position data representing an absolute position of the disk during one rotation and second position data having a resolution higher than that of the first position data based on the first detection signal and the second detection signal, and to specify the absolute position of the disk with a resolution higher than that of the first position data based on the first position data and the second position data.

15. The encoder according to claim 14, wherein:
the first rotating grating and the second rotating grating includes a first curved slit and a second curved slit, respectively, and curve degrees of the first curved slit and the second curved slit are set respectively in the manner that pitches of the first curved slit and the second curved slit are substantially equal.

* * * * *